Jan. 18, 1944. G. DEN BESTEN 2,339,463
SAFETY RELEASE HITCH
Filed Dec. 4, 1941

Inventor
Gerrit Den Besten
By Liverance and
Van Antwerp
Attorneys

Patented Jan. 18, 1944

2,339,463

UNITED STATES PATENT OFFICE 2,339,463

SAFETY RELEASE HITCH

Gerrit Den Besten, Pella, Iowa

Application December 4, 1941, Serial No. 421,604

6 Claims. (Cl. 280—33.16)

This invention relates to safety release hitches of the general character which is adapted to be secured to an implement and which has a pivotally mounted hook thereon to engage the clevis of a tractor, whereby the implement may be drawn by the tractor under normal load but be automatically released therefrom under abnormal load.

One of the objects of the invention is the provision of a pivotally mounted supporting member which is yieldably held in one position for maintaining the hook in engagement with the clevis, but which may be moved under abnormal load conditions to release the hook from the clevis.

Another object of the invention is the provision of a pin which is mounted for free movement on the support, against which one end of the hook bears when the implement is being drawn under normal load conditions, and which may be moved out of the path of the hook when, after release, it is desired to re-engage the hook and clevis.

A still further object of the invention is the provision of a lever which may be manually moved to effect a disengagement of the hook and clevis.

Oher objects and purposes of the invention will appear more fully as the description proceeds.

To the accomplishment of the foregoing and related ends said invention, then, consists of the means hereinafter fully described and particularly pointed out in the claims.

The annexed drawing and following description set forth in detail certain means for carrying out my invention, said means constituting, however, but one of various ways in which the principle of the invention may be employed.

In said annexed drawing, wherein like reference numerals refer to like parts throughout the various views.

Figure 1:
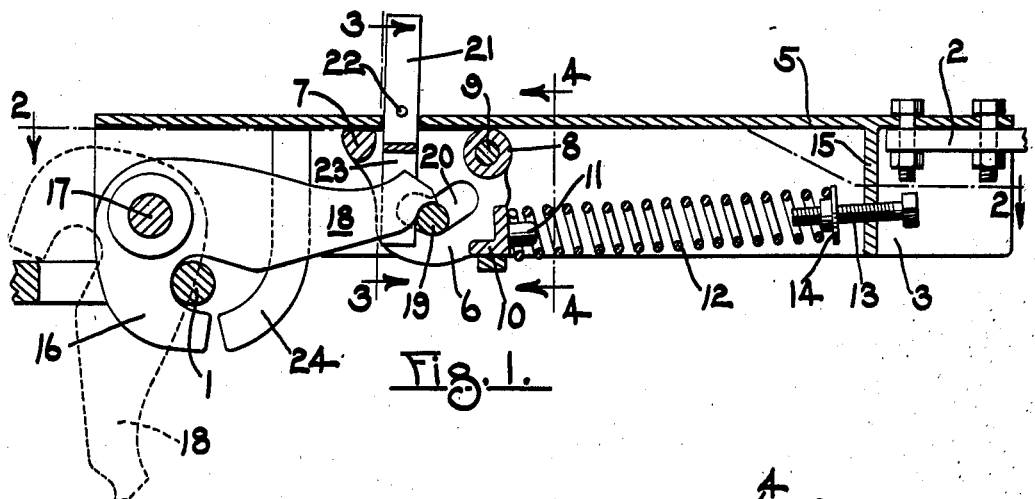
Fig. 1 is a longitudinal vertical section through the device showing the hook and clevis in engaged position.
Figure 2:
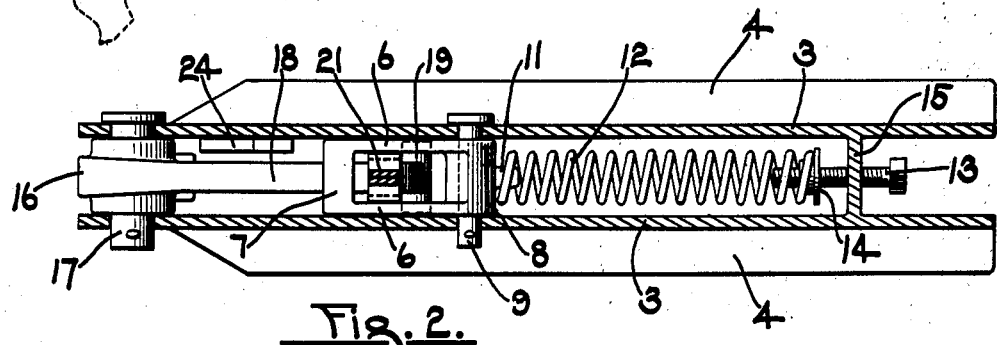
Fig. 2 is a longitudinal horizontal section taken along the plane of line 2—2 of Fig. 1.
Figure 3:
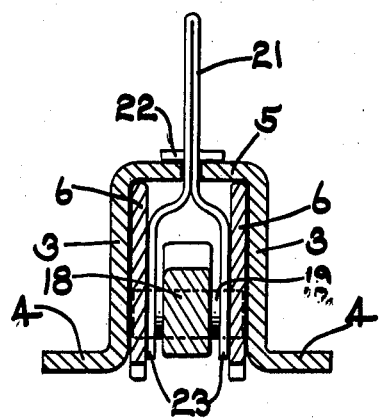
Fig. 3 is a somewhat enlarged vertical transverse section taken along the plane of line 3—3 of Fig. 1.
Figure 4:
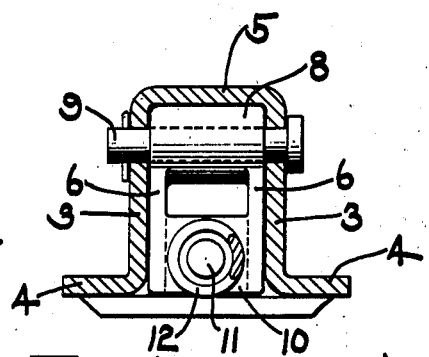
Fig. 4 is a vertical transverse section taken along the plane of line 4—4 of Fig. 1.

Referring now more particularly to the drawing, the clevis of the tractor is indicated at 1 and that portion of the implement to be drawn and to which the hitch member is secured is indicated at 2. The hitch itself is composed of a housing with spaced apart substantially vertical sides 3 which are flanged at their lower edges as at 4 and have a connecting web 5 between the upper edges of the sides to form the top.

Between the sides of the housing and beneath the top thereof a support is located which includes spaced apart sides 6 which, at their upper forward corners, are connected together by a cross-piece 7. Another cross-piece 8 connects the sides 6 at their upper rear corners and has an opening therethrough to receive a pivot pin 9, which pin also extends through the sides 3 of the housing to thereby provide a pivotal mounting for the support. At the lower rear corners of the spaced sides 6 another cross-piece 10 is located which has a rearwardly extending boss 11 thereon around which one end of a compression spring 12 is located and bears against the cross-piece 10. The other end of the spring 12 surrounds an elongated bolt 13 and bears against a collar 14 located on the bolt. This bolt is held against movement by being threadedly engaged with an opening in a web 15 which is cast integral with the housing and extends between the spaced sides 3 thereof. It will therefore be evident that the spring 12 yieldably holds the support against counter-clockwise rotation about its pivot pin 9, but will permit such rotation of the support when a force is exerted sufficiently great to overcome the force of the spring 12. The force exerted by this spring can be easily regulated by movement of the bolt 13 either toward or away from the support.

At the forward end of the housing a hook member 16 is mounted to rotate about a pivot pin 17 extending between the spaced sides of the housing. The hook is provided with a rearwardly extending tail-piece 18 and at the under side of its rear end is arcuately formed so as to rest on and bear against the pin 19 which extends between the sides 6 of the support. At its ends the pin 19 rests in and is freely movable longitudinally of an elongated substantially L-shaped slot 20 located in each side of the support. The clevis 1 will exert a forward pull against the hook when the implement is being drawn, thereby exerting a downward pressure against the pin 19 which is in its normal position resting at the juncture of the two arms of the slot 20. The implement will be drawn in this manner under normal load conditions, but when an abnormal load is obtained, which may occur by reason of the implement striking an object such as a stone or rock, the force of the spring 12 will be overcome and the downward pressure of the tail-piece 18 against the pin 19 will urge the support in a counter-clockwise direction about its pivot pin against the force of the spring. If such abnormal force continues to exist, the support will continue to rotate to a point where the pin 19 will be removed from the path of the tail-piece 18 thereby permitting the hook to disengage itself from the clevis 1.

When it is desired to re-engage the hook and clevis it is merely necessary to move the tractor rearwardly where it will engage against one side of the tail-piece 18 as shown in its disengaged position in dotted lines in Fig. 1, and as the tractor continues to move rearwardly the hook will rotate in a counter-clockwise direction to a point where the upper rear edge of the tail-piece 18 will contact the pin 19. This portion of the tail-piece is so formed as to have a camming surface which will move the pin 19 upwardly and rearwardly in the slot 20 until it is completely removed from the path of the tail-piece.

After the end of the tail-piece has moved to a point above the pin 19 said pin, by force of gravity, will drop back to its normal position as shown in Fig. 1 whereupon the under side of the end of the tail-piece will rest thereagainst. At this point the clevis and hook will have been re-engaged and the implement may be then drawn by the tractor.

In some instances it may be desirable to manually disengage the hook and clevis and for this purpose I have provided a lever arm 21 which, in the form illustrated, is formed of an elongated narrow sheet of material bent back upon itself to form the handle portion which extends upwardly through an opening in the top 5 of the housing. A pin 22 passes through the handle 21 and rests on the housing to prevent the lever arm from dropping out. Beneath the top of the housing the two sides of the lever are spread outwardly and downwardly to form a yoke comprising the members 23, which members extend downward and are located in front of the pin 19. If it is then desired to manually release the hitch from the tractor a forward movement of the handle 21 will move the yoke 23 rearwardly against the pin 19 thereby moving it upwardly and rearwardly in the slots 20 to a point where it will be out of the path of the tail-piece 18, thus permitting the tail-piece to drop down and the hook to assume the dotted line position of Fig. 1 thus disengaging it from the clevis.

A downwardly extending and forwardly curved arm 24 is also provided which is secured to one of the sides 3 of the housing. The obvious purpose of such an arm is to act as a detent for the clevis to prevent its dropping out or away from the hook when no pull is being exerted and when there is slack between the hook and clevis.

From the foregoing description it will be obvious that various novel means have been provided to effect an automatic release of the connections between a tractor and drawn implement. Practically all of the parts are formed of cast members and sufficiently few in number to facilitate assembly thereby providing an economy in manufacture.

Other modes of applying the principle of my invention may be used instead of the one here explained, change being made as regards the structure herein disclosed, provided, however, that the means stated by any of the following claims or the equivalent of such stated means be employed.

I claim:

1. A safety release hitch comprising, a clevis attached to a tractor, a housing attached to an implement, a hook pivotally mounted on said housing and adapted to engage said clevis whereby the implement may be drawn, a support within said housing having spaced apart sides and pivotally mounted to rotate between the sides of the housing, substantially L-shaped slots in the sides of the support, a pin on said support resting at its ends in said slots and freely movable therein, said pin in its normal position being at the juncture of the two arms in said slots, a web located rearwardly of said support between the sides of said housing, a bolt extending forwardly through said web, a boss on said support extending rearwardly therefrom, a compression spring extending between said bolt and boss to thereby yieldably hold said support against movement, and a tail-piece on said hook bearing downwardly against said pin when engaged with said clevis and the implement is being drawn under normal load, said support and pin being movable against the force of said spring to move said pin away from said tail-piece under abnormal load, whereby the hook and clevis are disengaged.

2. A safety release hitch comprising, a clevis attached to a tractor, a housing attached to an implement, a hook pivotally mounted on said housing adapted to engage said clevis whereby the implement may be drawn, a support having spaced apart sides pivotally mounted within said housing, elongated slots in the sides of said support, a pin extending between the sides of said support and freely movable lengthwise of said slots, a web located rearwardly of said support, a bolt extending forwardly through said web, a coiled compression spring surrounding said bolt and bearing against said web at one end and bearing against said support at the other end to yieldably hold said support against movement, and a tail-piece on said hook bearing downwardly against said pin when the implement is being drawn under normal load, said support and pin being movable against the force of said spring to move said pin away from said tail-piece under abnormal load, whereby the hook and clevis will be disengaged.

3. The combination of elements defined in claim 2, wherein said tail-piece at its upper rear end has a camming surface adapted to bear against said pin and move said pin in said slots out of the path of the tail-piece when it is moved upwardly after disengagement from said clevis to thereby effect a re-engagement thereof.

4. A safety release hitch comprising, a clevis, a housing, a hook pivotally mounted on the housing, a support pivotally mounted in the housing, a stop member movably mounted on said support, a tail-piece on said hook normally engaging said stop member, yieldable means for holding said support with the stop means in engagement with said tail-piece under normal load and permitting movement of the support to disengage the stop means from the tail-piece under abnormal load and a manually operated lever engageable with said stop means to move it on said support out of engagement with said tail-piece.

5. The elements in combination defined in claim 4 in which said stop means is a roller mounted on a surface of said support, said surface being inclined relative to a line extending between the pivotal centers of said support and said hook.

6. The elements in combination defined in claim 4 in which said stop means is a roller mounted on a surface of said support, said surface being inclined relative to a line extending between the pivotal centers of said support and said hook and is also inclined downwardly toward said tail-piece relative to the horizontal.

GERRIT DEN BESTEN.